US009483836B2

(12) United States Patent
Usikov (10) Patent No.: US 9,483,836 B2
(45) Date of Patent: Nov. 1, 2016

(54) METHOD AND APPARATUS FOR REAL-TIME CONVERSION OF 2-DIMENSIONAL CONTENT TO 3-DIMENSIONAL CONTENT (71) Applicant: SONY CORPORATION, Tokyo (JP)

(72) Inventor: Daniel Usikov, Newark, AL (US)

(73) Assignee: SONY CORPORATION, Tokyo (JP)

(*) Notice: Subject to any disclaimer, the term of this patent is extended or adjusted under 35 U.S.C. 154(b) by 238 days.

(21) Appl. No.: 13/911,389

(22) Filed: Jun. 6, 2013

(65) Prior Publication Data
US 2014/0363100 A1 Dec. 11, 2014

(51) Int. Cl.
G06G 5/00 (2006.01)
G06T 7/20 (2006.01)
H04N 13/02 (2006.01)
G06T 7/00 (2006.01)

(52) U.S. Cl.
CPC ............... G06T 7/20 (2013.01); G06T 7/0071 (2013.01); H04N 13/026 (2013.01); G06T 2207/10016 (2013.01)

(58) Field of Classification Search
CPC combination set(s) only.
See application file for complete search history.

(56) References Cited

U.S. PATENT DOCUMENTS

| 5,699,443 | A | 12/1997 | Murata et al. | |
|---|---|---|---|---|
| 6,377,625 | B1* | 4/2002 | Kim | H04N 13/026 348/43 |
| 6,496,598 | B1 | 12/2002 | Harman | |
| 7,254,265 | B2* | 8/2007 | Naske | H04N 13/0022 348/E13.02 |
| 8,218,893 | B2* | 7/2012 | Lim | G06T 15/205 382/266 |
| 8,711,141 | B2* | 4/2014 | Xie | G06T 7/0051 345/419 |
| 9,030,469 | B2* | 5/2015 | Huang | G06T 7/0071 345/419 |
| 2009/0115780 | A1* | 5/2009 | Varekamp | G06T 15/205 345/419 |
| 2009/0116732 | A1 | 5/2009 | Zhou et al. | |
| 2011/0096832 | A1* | 4/2011 | Zhang et al. | 375/240.08 |
| 2011/0109720 | A1* | 5/2011 | Smolic | H04N 13/0018 348/43 |
| 2011/0115790 | A1* | 5/2011 | Yoo | G06T 7/0071 345/419 |
| 2011/0249886 | A1 | 10/2011 | Park et al. | |
| 2012/0127267 | A1* | 5/2012 | Zhang et al. | 348/43 |
| 2012/0127270 | A1* | 5/2012 | Zhang | G06T 7/0071 348/43 |
| 2012/0194506 | A1 | 8/2012 | Passmore | |
| 2012/0294363 | A1* | 11/2012 | Lee | H04N 19/56 375/240.15 |
| 2012/0294521 | A1* | 11/2012 | Lee | G06T 7/0071 382/164 |
| 2012/0308203 | A1* | 12/2012 | Matsudo | H04N 13/0022 386/241 |
| 2012/0327078 | A1* | 12/2012 | Liao | H04N 13/0022 345/419 |

(Continued)

FOREIGN PATENT DOCUMENTS

JP 2000-261828 A 9/2000
JP 2001-359119 A 12/2001

(Continued)

OTHER PUBLICATIONS

Japanese Office Action issued on Mar. 4, 2015 in patent application No. 2014-113801.

Primary Examiner — M Good Johnson
(74) Attorney, Agent, or Firm — Chip Law Group (57) ABSTRACT Various aspects of a method and apparatus for video processing may include a computing device communicably coupled to an external device. The computing device may be operable to determine an average vertical velocity and an average horizontal velocity of a subset of pixels in an image frame and determine a depth value for each pixel of the subset of pixels based on calculated motion vectors of the pixel of the subset of pixels, the average vertical velocity of the subset of pixels and the average horizontal velocity of the subset of pixels.

21 Claims, 6 Drawing Sheets

(56) References Cited

U.S. PATENT DOCUMENTS

| | | | | |
|---|---|---|---|---|
| 2013/0101177 A1* | 4/2013 | Yamada | ............... | G06T 7/0051 382/107 |
| 2013/0162629 A1* | 6/2013 | Huang | ................ | G06T 7/0071 345/419 |
| 2013/0162768 A1* | 6/2013 | Lie | ................... | H04N 13/0264 348/43 |
| 2013/0177236 A1* | 7/2013 | Kim | ................. | G06K 9/00201 382/154 |
| 2013/0235155 A1* | 9/2013 | Feng | ................ | H04N 13/0264 348/43 |
| 2013/0314494 A1* | 11/2013 | Chen | ................... | G06T 7/0071 348/43 |
| 2014/0118494 A1* | 5/2014 | Wu | ..................... | G06T 7/0065 348/44 |

FOREIGN PATENT DOCUMENTS

| | | |
|---|---|---|
| JP | 2004-133919 A | 4/2004 |
| JP | 2006-014121 A | 1/2006 |
| WO | 2011/030399 A1 | 3/2011 |
| WO | 2012/064010 A | 5/2012 |

* cited by examiner

METHOD AND APPARATUS FOR REAL-TIME CONVERSION OF 2-DIMENSIONAL CONTENT TO 3-DIMENSIONAL CONTENT

CROSS-REFERENCE TO RELATED APPLICATIONS/INCORPORATION BY REFERENCE

This application makes reference to U.S. patent application Ser. No. 13/432,065 filed on Mar. 28, 2012, which is hereby incorporated herein by reference in its entirety.

This application makes reference to U.S. patent application Ser. No. 13/036,656 filed on Feb. 28, 2011, which is hereby incorporated herein by reference in its entirety.

FIELD

Various embodiments of the disclosure relate to content conversion. More specifically, various embodiments of the disclosure relate to a method and apparatus for real-time conversion of 2-dimensional (2D) content to 3-dimensional (3D) content.

BACKGROUND

Manufacturers of consumer electronic devices have to deal with efficiency related issues when they attempt to utilize limited memory space available without compromising on processing power. Especially, during the conversion of two-dimensional content to three-dimensional content in real-time, consumer electronic devices require high processing power and large memory space. Hence, there is a need for an efficient 2D-to-3D content conversion system.

Further limitations and disadvantages of conventional and traditional approaches will become apparent to one of skill in the art, through comparison of such systems with some aspects of the present disclosure as set forth in the remainder of the present application with reference to the drawings.

SUMMARY

A method and apparatus for real-time conversion of 2-dimensional content to 3-dimensional content substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various implementations may be found in a method and/or apparatus for providing a real-time conversion of 2-dimensional content to 3-dimensional content.

Exemplary aspects of the disclosure may include a computing device for video processing. In an embodiment, the computing device may determine an average vertical velocity and/or an average horizontal velocity of a subset of pixels in an image frame. A depth value may be determined for each pixel of the subset of pixels based on calculated motion vectors associated with the pixel of the subset of pixels, the average vertical velocity and the average horizontal velocity.

Motion vector algorithms may not be able to calculate the motion vector for pixels within homogenous areas in the image frame. The motion vectors corresponding to such pixels within homogenous areas may be considered for further calculations. In an embodiment, the motion vectors corresponding to the image frame may be provided as an input. The motion vector corresponding to one or more pixels may be unknown or not defined in the given input. Such pixels with unknown motion vectors and/or undefined motion vectors may not have predetermined motion vectors and hence not included in the subset of pixels for depth computation.

In an embodiment, a depth value may be determined for each pixel of the subset of pixels based on calculated motion vectors associated with the pixel of the subset of pixels, an average vertical pixel velocity of the image frame and an average horizontal pixel velocity of the image frame. The average vertical pixel velocity and the average horizontal pixel velocity may be calculated based on pixels with the predetermined motion vectors in the image frame. The computing device may generate a stereoscopic image pair for the image frame based on the depth values associated with the pixels of the image frame. The stereoscopic image pair may include a left image, in which each pixel in the image frame may be shifted left by a particular value and a right image, in which each pixel in the image frame may be shifted right by the particular value. The particular value may be proportional to a depth value associated with each pixel in the image frame. In an embodiment, the subset of pixels may belong to one or more rows of pixels in the image frame.

In an embodiment, the image frame may be a two-dimensional (2D) image frame. In an embodiment, the image frame may be a two-dimensional (2D) image frame with a downsized pixel resolution. In an embodiment, the computing device may receive the image frame from one or both of an external device and/or a local memory. The computing device may include one or more of a television, a smart phone, a tablet, a laptop, and/or a desktop computer. The external device may include one or more of a video player, a set-top-box, a personal video recorder, a video camera, and/or a cloud server.

Figure 1:
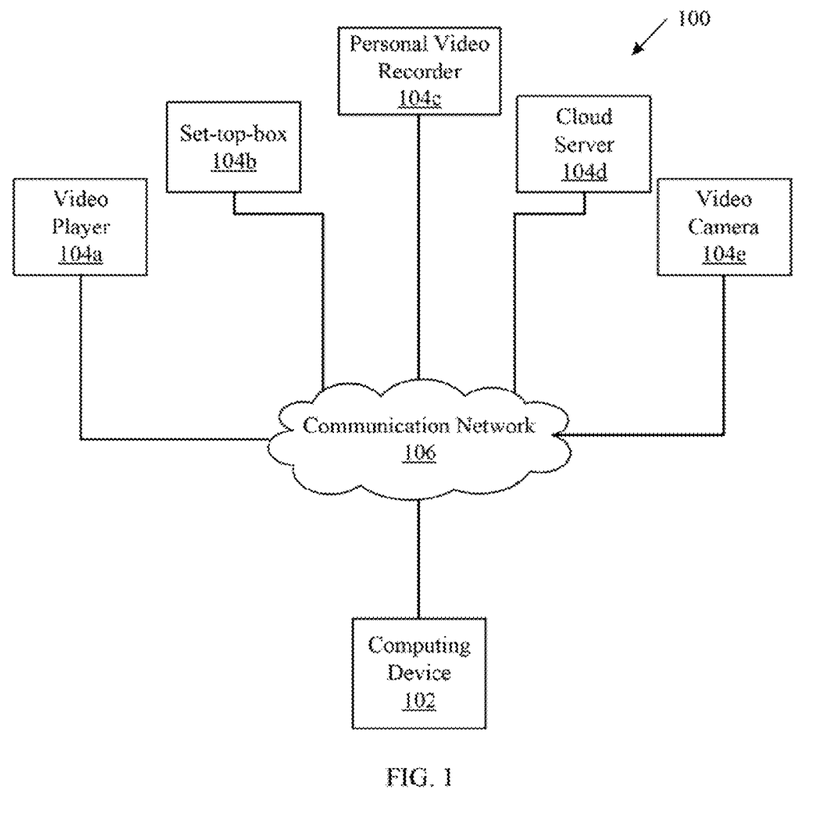
FIG. 1 is a block diagram illustrating a network environment for real-time 2D-to-3D conversion, in accordance with an embodiment of the disclosure.

FIG. 1 is a block diagram illustrating a network environment for real-time 2D-to-3D conversion, in accordance with an embodiment of the disclosure. In reference to FIG. 1, there is shown a network environment 100. The network environment 100 may include a computing device 102, one or more external devices 104, such as, a video player 104a, a set-top-box 104b, a personal video recorder 104c, a cloud server 104d, a video camera 104e, and a communication network 106. Notwithstanding, the disclosure may not be so limited, and other external devices may be utilized without limiting the scope of the disclosure.

The computing device 102 may include suitable logic, circuitry, interfaces, and/or code that may enable communication with the external device (such as 104a) directly, or via the communication network 106. In an embodiment, the computing device 102 may be capable of transmitting and/or receiving instructions and commands to/from the external device (such as 104a). The computing device 102 may also be capable of playing three-dimensional (3D) content. Examples of the computing device 102 may include, but are not limited to, a television, a smartphone, a tablet, a laptop, and/or a desktop computer. Notwithstanding, the disclosure may not be so limited, and other computing devices may be utilized without limiting the scope of the disclosure.

The external device (such as 104a) may include suitable logic, circuitry, interfaces, and/or code that may enable communication with the computing device 102 directly, or via the communication network 106. In an embodiment, the external device (such as 104a) may be capable of transmitting and/or receiving instructions and commands to/from the computing device 102. In another embodiment, the external device (such as 104a) may provide media content that may be requested by the computing device 102.

The communication network 106 may include a medium through which the computing device 102 and the external device (such as 104a) in the network environment 100 may communicate with each other. The communication network 106 may be enabled by one or more communication protocols which include, but are not limited to, Wireless Fidelity (Wi-Fi), Wireless Universal Serial Bus (WUSB), Local Area Network (LAN), ZigBee, Transmission Control Protocol and Internet Protocol (TCP/IP), Ethernet, Cable network, Satellite network, Digital Living Network Alliance (DLNA) home network, and/or Bluetooth communication protocols. Various components in the network environment 100 may connect to the communication network 106, in accordance with various wired and wireless communication protocols, such as TCP/IP, User Datagram Protocol (UDP), ZigBee, Infrared (IR), IEEE 802.11a, IEEE 802.11b, IEEE 802.11g, and/or IEEE 802.11n communication protocols.

In operation, the computing device 102 and the external device (such as 104a) may be switched on and the connection between the computing device 102 and the external device (such as 104a) may be activated, via the communication network 106. The computing device 102 may receive a media content from the external device (such as 104a) based on a request that may be communicated by the computing device 102. The media content may include one or more image frames that may constitute 2D content. The computing device 102 may compute motion vectors for all the pixels in the received one or more image frames. The computing device 102 may compute motion vectors based on one or more algorithms. The computing device 102 may determine the depth associated with one or more pixels based on the calculated motion vectors.

Further, the computing device 102 may generate a stereoscopic image pair corresponding to the image frame based on the computed depth map. The stereoscopic image pair includes a left image and a right image. The stereoscopic image pair forms the 3D content corresponding to the 2D image frame communicated by the external device (such as 104a).

In an embodiment, the 3D content may be displayed on a display screen associated with the computing device 102. In an embodiment, the 3D content generated by the computing device 102 (such as the smartphone) may be communicated to any display device (such as a monitor) for display.

In an embodiment, the 2D content may be one or more of a movie stored in a removable disc in the video player 104a, a live TV program communicated by the set-top-box 104b, a media content recorded by the personal video recorder 104c, a media content stored in the cloud server 104d, a video footage communicated by the video camera 104e, and/or the like.

Figure 2:
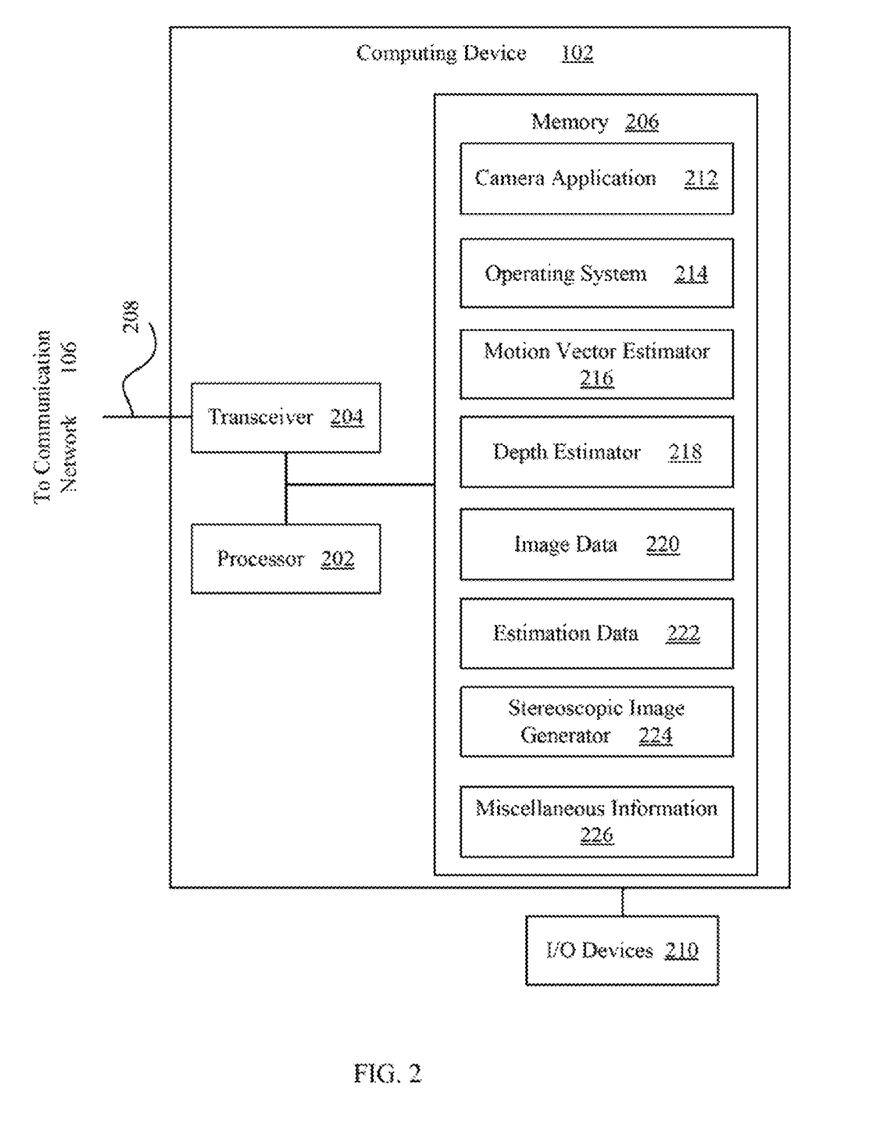
FIG. 2 is a block diagram of a computing device, in accordance with an embodiment of the disclosure.

FIG. 2 is a block diagram of a computing device, in accordance with an embodiment of the disclosure. FIG. 2 is explained in conjunction with elements from FIG. 1. In reference to FIG. 2, there is shown the computing device 102. The computing device 102 may include, but not limited to, a processor 202, a transceiver 204, a memory 206, a communication interface 208, and the input-output (I/O) devices 210. The memory 206 may include, but not limited to, a camera application 212, an operating system 214, a motion vector estimator 216, a depth estimator 218, image data 220, estimation data 222, a stereoscopic image generator 224 and miscellaneous information 226.

The processor 202 may be communicatively coupled to the memory 206, the transceiver 204, and the I/O devices 210. The transceiver 204, via the communication interface 208, may be communicatively coupled to the communication network 106.

The processor 202 may include suitable logic, circuitry, interfaces, and/or code that may be operable to execute a set of instructions stored in the memory 206. The processor 202 may be implemented based on one or more processor technologies known in the art. Examples of the processor 202 may be an X86-based processor, a RISC processor, an ASIC processor, a CISC processor, or any other processor.

The memory 206 may include suitable logic, circuitry, interfaces, and/or code that may be operable to store the received set of instructions. The memory 206 may be implemented based on, but not limited to, a Random Access Memory (RAM), a Read-Only Memory (ROM), a Hard Disk Drive (HDD), a storage server, and/or a secure digital (SD) card.

The transceiver 204 may include suitable logic, circuitry, interfaces, and/or code that may be operable to communicate with the external device (such as 104a), via the communication interface 208. In an embodiment, the transceiver 204 may be operable to communicate directly with the external device (such as 104a). The transceiver 204 may implement known technologies for supporting wired or wireless communication with the communication network 106.

The I/O devices 210 may include suitable logic, circuitry, interfaces, and/or code that may be operably coupled to the processor 202 to receive a user input and display the 3D content. Examples of the input devices may include, but are not limited to, a touch pad, a track pad, a sensor, a camera, and/or a microphone. Examples of the output devices may include, but are not limited to, a Liquid Crystal Display (LCD) and/or a Light Emitting Diode (LED) display. Notwithstanding, the disclosure may not be so limited, and other I/O devices 210 may be utilized without limiting the scope of the disclosure.

In operation, the external device (such as 104a) may communicate the 2D content to the computing device 102.

The processor 202 may receive the 2D content communicated by the external device (such as 104a). In an embodiment, the processor 202 may receive the 2D content from the memory 206. Camera application 212 may include program instructions that may be preferably executed by the processor 202 to perform various functions and operations of the computing device 102. The operating system 214 may control and coordinate low-level functionality of the computing device 102. The motion vector estimator 216 may control and coordinate the motion vector estimation procedure. This may include determining the motion vectors corresponding to each pixel of the image frame or receiving motion vector information corresponding to the image frame. In an embodiment, the motion vector estimator 216 may determine an average motion vectors for an image frame and use the same average motion vector for predefined number of subsequent image frames.

The depth estimator 218 may control and coordinate a depth estimation procedure to determine the depth value associated with each pixel in the image frame. The image data 220 may include one or more image frames. The estimation data 222 may include any type of information or data for performing a depth estimation procedure. The stereoscopic image generator 226 may control and coordinate stereoscopic image generation procedure to generate a stereoscopic image pair corresponding to the image frame. The stereoscopic image generation procedure may utilize the results of the depth estimation procedure to generate the stereoscopic images. Miscellaneous information 226 may include other appropriate information for the operation of the computing device 102. For better understanding of the disclosure, there is an example illustrated in FIG. 3.

Figure 3:
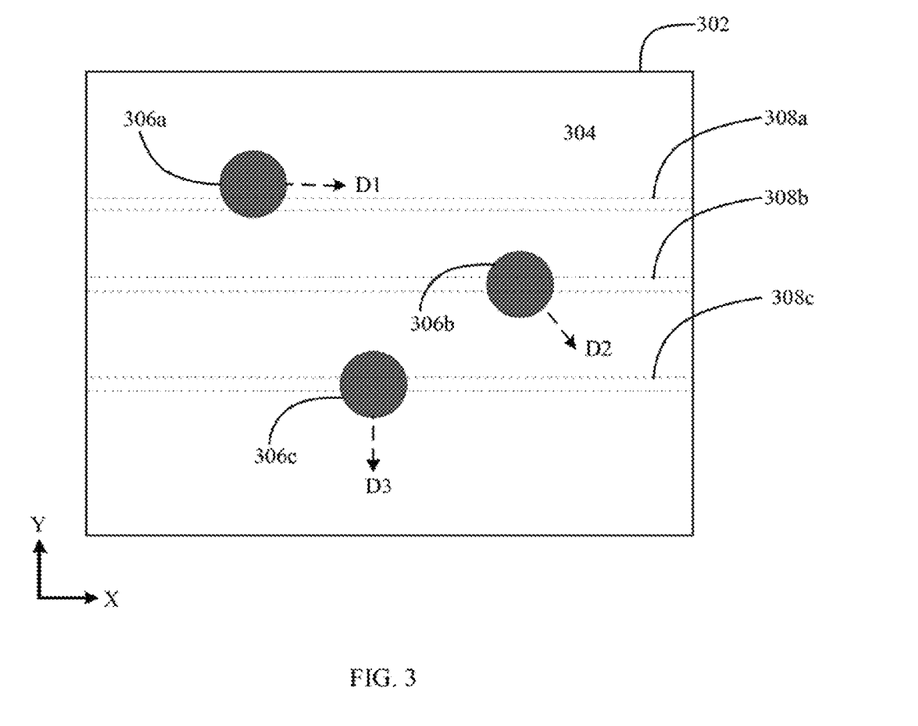
FIG. 3 illustrates an image frame, in accordance with an embodiment of the disclosure.

FIG. 3 illustrates an image frame, in accordance with an embodiment of the disclosure. FIG. 3 is explained in conjunction with elements from FIG. 2 and FIG. 1. In reference to FIG. 3, there is shown an image frame 302. The image frame 302 may include object 306a, object 306b, object 306c, and the like (hereafter referred to collectively as objects 306) moving in directions shown by corresponding arrows D1, D2, D3 and/or the like respectively, and background 304. A subset of pixels (such as 308a, 308b, 308c) corresponds to a row of pixels in the image frame 302. The object 306a moves along X direction, as shown by an arrow D1. The object 306a has velocity along X direction only. The object 306b moves diagonally along X-Y plane, as shown by an arrow D2. The object 306b has velocity along both X direction and Y direction. The object 306c moves along the Y direction, as shown by an arrow D3. The object 306c has velocity along Y direction only. The processor 202 may compute motion vectors for the plurality of pixels in the image frame 302. Further, the processor 202 may determine depth value associated with each pixel within the plurality of pixels.

In an embodiment, the processor 202 may perform the identification in steps, by processing the subset of pixels (such as 308a, 308b, 308c, and the like) from the image frame 302 at a time. The subset of pixels (such as 308a) may belong to one or more rows of the image frame 302.

In an embodiment, the processor computes average pixel velocity of the image frame in the X direction (hereinafter referred to as "aver $V_X$") and in the Y direction (hereinafter referred to as "aver $V_Y$"). The processor 202 may be operable to compute a depth value for each pixel in the image frame 302 based on the motion vectors of each pixel in the image frame 302 and the average pixel velocities. In an embodiment, the processor 202 may compute a depth value corresponding to each pixel in the image frame 302 using the below mentioned equation (1):

$$\text{Depth} = \text{abs}(V_X - \text{aver}V_X) + \text{abs}(V_Y - \text{aver}V_Y) \tag{1}$$

where, $V_X$ and $V_Y$ are velocities in X direction and Y direction, respectively for the pixel in the image frame 302, and aver$V_X$ and aver$V_Y$ are the average pixel velocities in the X direction and the Y direction, respectively. In an embodiment, the motion vector algorithm may not be able to calculate the motion vector corresponding to one or more pixels. In such instances, the motion vector of such pixels may not be included in the calculation of the average pixel velocities. In an embodiment, the average pixel velocities used for depth value calculation may be average pixel velocities for the subset of pixels (such as 308a). The subset of pixels (such as 308a) may include the pixel for which the depth value may be calculated.

A majority of pixels having approximately the same velocity vectors are called the "background pixels", The remaining pixels are called the "foreground pixels". When the average velocity of the background pixels are used for averVx, averVy in formula (I) above (instead of the average frame velocity), the viewer-perception quality of the depth map increases.

In an embodiment, motion vectors for some pixels in image frame 302 may be unknown. This may happen in the areas where the texture may be absent or weak, such as a cloudless sky. The described algorithm may take care of this deficiency by utilizing the human ability of filling the depth in the homogeneous areas by extrapolating the depth from areas with a good texture.

In an embodiment, the average motion vectors of a previous image frame may be applied to a current image frame. The calculation of depth values for the current image frame may be estimated using the average velocity associated with a previous image frame. This may reduce computation and time required for estimation of depth values associated with an image frame 302. Further, the average motion vector, say for a movie, may change little from frame to frame. The average motion vector may change significantly between different episodes, but in such a case one or more frames with incorrect depth may be unnoticed by a viewer, because the human brain may require at least 3-4 frames in the movie to form the parallax-based depth perception.

A stereoscopic image pair may be generated corresponding to the image frame 302. The stereoscopic image frame may include two images—a left image and a right image. The left image may be created by shifting the pixels in the image frame 302 to the left by a particular value proportional to the depth associated with each pixel. The right image may be create by shifting the pixels in the image frame 302 to the right by a particular value proportional to the depth associated with each pixel. The stereoscopic image pair forms 3D representation of the received 2D image frame.

The stereoscopic image pair forms 3D representation of the received 2D image frame. The stereoscopic images may correspond to the 3D content generated from the 2D content communicated by the external device (such as 104a). Further, the 3D content may be displayed on the display screen associated with the computing device 102. The method explores experimental observations about stereoscopic perception by humans. Specifically, the method utilizes the observation that the accurate depth map may be defined only for the areas with good texture in the image frame 302. Further, the method utilizes the observation that a jump in the average depth just in one frame when a new movie episode starts may go unnoticed by a viewer.

Figure 4A:
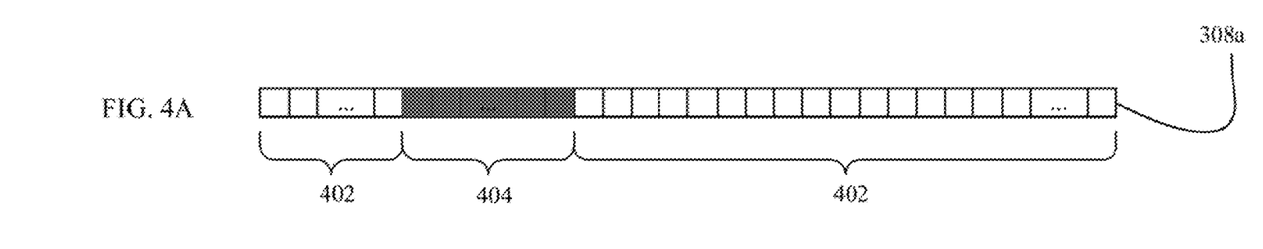
FIGS. 4A-4C are exemplary diagrams illustrating a row of pixels in the image frame, in accordance with an embodiment of the disclosure.
Figure 4B:
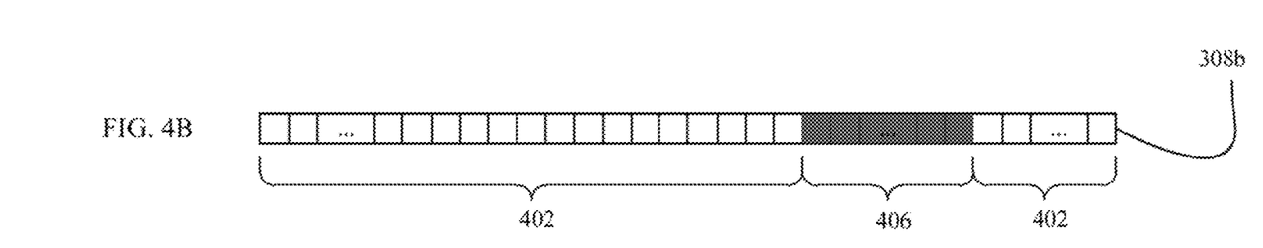
Figure 4C:
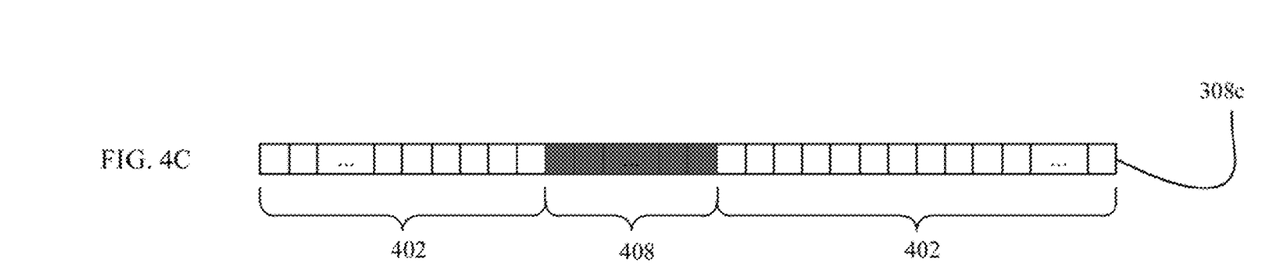

FIGS. 4A-4C are exemplary diagrams illustrating a row of pixels in the image frame 302, in accordance with an embodiment of the disclosure. FIGS. 4A-4C are explained in conjunction with elements from FIG. 3. FIG. 4A shows a row of pixels in the image frame 302, overlapping with the position of object 306a. Each pixel in a group of pixels 404 corresponds to the object 306a and has a velocity along X direction only. FIG. 4B shows a row of pixels in the image frame 302, overlapping with the position of object 306b. Each pixel in a group of pixels 406 corresponds to the object 306b and has a velocity along X direction and Y direction. FIG. 4C shows a row of pixels in the image frame 302, overlapping with the position of object 306c. Each pixel in a group of pixels 408 corresponds to the object 306c and has a velocity along Y direction only. Each pixel in a group of pixels 402 corresponds to background.

In an embodiment, a motion vector corresponding to each pixel in the image frame 302 may be computed separately for X and Y directions. The calculated motion vectors provide information regarding the velocity of each pixel in the X and Y directions in the image frame. In an embodiment, the motion vector algorithm may not provide information regarding the reliability of the motion vector of each pixel. This issue may be fixed by calculating the local texture and then using it as a motion vector reliability map. Pixels with absolute value of the spatial gradient above a threshold may be considered to have reliable motion vectors. The processor 202 may calculate average pixel velocity in the X direction and the Y direction for the image frame 302 based on the calculated motion vectors. Depth of each pixel may be determined based on the velocity in the X and Y directions corresponding to each pixel in the row of pixels (such as 308a) and the average pixel velocity of the image frame 302 in the X direction and the Y direction, respectively. The equation 1 described earlier may be used for determining the depth value associated with each pixel in the row of pixels (such as 308a). Only the pixels with well-defined velocity vector participate in the calculation of average velocity and the depth value. The depth for the pixel with non-defined velocity is assigned equal to zero (as if they were the background pixels). While viewing the 3D movie, the human brain assigns the depth to these pixels interpolating it from the nearest areas with texture.

In an embodiment, the processor 202 may be operable to compute a depth map of each pixel in the image frame 302 based on the motion vectors of the pixel, the average vertical velocity and the average horizontal velocity of the background pixels. The processor 202 may create stereoscopic image pairs corresponding to the image frame 302 based on the depth map. The stereoscopic image frame may include a left image and a right image. The left image may be generated by shifting the foreground pixels to the left by a particular value. The right image may be generated by shifting the foreground pixels to the right by the particular value. The particular value may be proportional to a depth value associated with each of the foreground pixels.

The stereoscopic image pair, comprising the left image and the right image, forms 3D content corresponding to the image frame 302. The stereo effect of the 3D content may be displayed on the I/O devices 210 of the computing device 102. In an embodiment, the computing device 102 may communicate the 3D content to another display device associated with the computing device 102. For example, the computing device 102 (the smartphone, for example) may communicate the 3D content to a display device (a monitor, for example). Thus, real-time 2D-to-3D content conversion may be accomplished using the computing device 102.

In an embodiment, a coefficient of proportionality may be used to regulate the depth margins to accommodate the distance of the viewer from the screen. This may result in generation of better 3D content from the corresponding 2D image frame.

In an embodiment, the processor 202, while calculating the motion vectors and/or the depth map, may downsize the image frame 302 by a pre-defined factor (such as two times in each direction). The perception of the depth calculated on the downsized frame and then applied back to the original size frame may be indistinguishable to the human eye when compared with the depth map calculated directly on the original size image. Notwithstanding, the disclosure may not be so limited, and other pre-defined factors may be utilized without limiting the scope of the disclosure. Further, the processor 202 may utilize the luminescence component of the pixels in the image frame 302 or the downsized image frame for the computation of the motion vectors. In an embodiment, the processor 202 may utilize the luminescence component of the pixels, having a texture within the pre-defined range, in the downsized image frame for the computation of the motion vectors.

In an embodiment, the processor 202 may store a subset of pixels (such as 308a) in the memory 206, for computing the depth associated with each pixel. Accordingly, the need for full frame memory may be overcome since the memory 206 may store one row of pixels at a point in time. Therefore, significant reduction in memory use can be achieved by the method herein disclosed. In addition, downsizing the pixel resolution of the image frame and reducing the number of pixels in a row may further reduce the memory requirement for computation. In an embodiment, the processor 202 may operate on the luminescence component of the pixels in the downsized image frame with a texture within the pre-defined range, further reducing the computation and memory requirement.

In accordance with another embodiment, the computation time can be reduced by performing computations on one or more rows in parallel. Notwithstanding, the disclosure may not be so limited, and other techniques may be utilized for reducing computation time without limiting the scope of the disclosure.

The above mentioned method may be stored on a chip associated with the computing device 102, in order to provide 2D-to-3D content conversion. Further, the method described in this disclosure may be combined with a motion vector calculation chip in order to provide a standalone device that may be used for providing 2D-to-3D content conversion.

Figure 5:
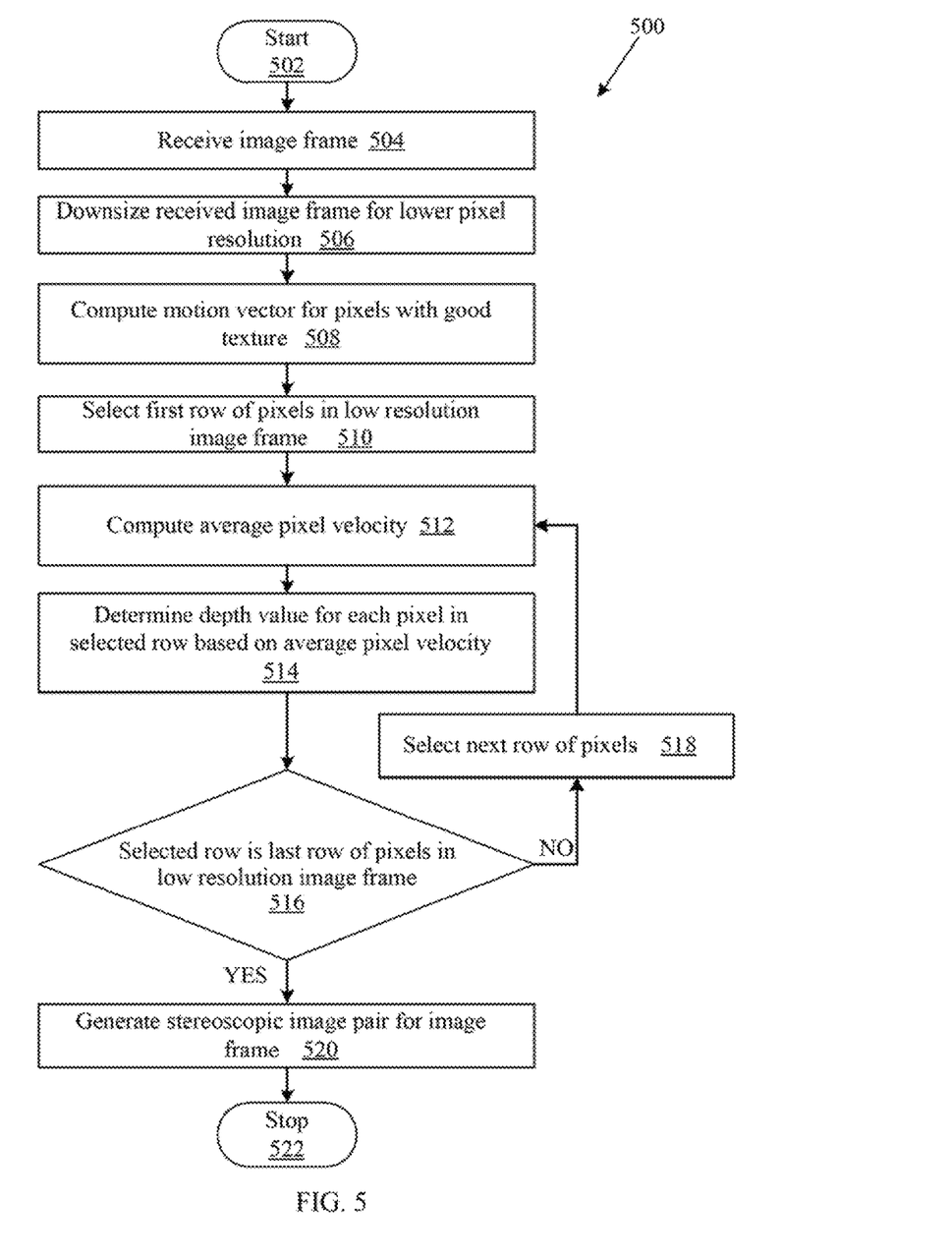
FIG. 5 is a flow chart illustrating exemplary steps for providing a real-time 2D-to-3D conversion at a computing device, in accordance with an embodiment of the disclosure.

FIG. 5 is a flow chart illustrating exemplary steps for providing a real-time 2D-to-3D conversion at a computing device, in accordance with an embodiment of the disclosure. In reference to FIG. 5, there is shown a method 500. The method 500 is described in conjunction with the elements of FIG. 1, FIG. 2, FIG. 3, and FIG. 4.

Exemplary steps begin at step 502. At step 504, the computing device 102 may receive the 2D content communicated by the external device (such as 104a). The processor 202 may receive the image frame 302 corresponding to the 2D content communicated by the external device (such as 104a). At step 506, the processor 202 may downsize the image frame 302 corresponding to the 2D content by a pre-defined factor to obtain an image frame with a lower pixel resolution. At step 508, the processor 202 may compute motion vectors for pixels, with texture above threshold, in the image frame with lower pixel resolution. At step 510, the processor 202 may select the first row of pixels in the image frame with lower pixel resolution.

At step 512, the processor 202 may compute the average pixel velocity for the selected row of pixels. At step 514, the processor 202 may determine the depth value for each pixel in the selected row based on the average pixel velocity for the selected row of pixels. At step 516, the processor 202 checks whether the selected row is the last row of the image frame 302. In instances where the selected row is not the last row, the process proceeds to step 518. At step 518, the processor 202 selects the next row and proceeds to step 512. In instances where the selected row is the last row, the process proceeds to step 520. At step 520, the processor may generate the stereoscopic image pair corresponding to the image frame 302. The stereoscopic image pair may be generated based on the depth value associated with each pixel in the image frame 302. The method 500 ends at step 522.

Figure 6:
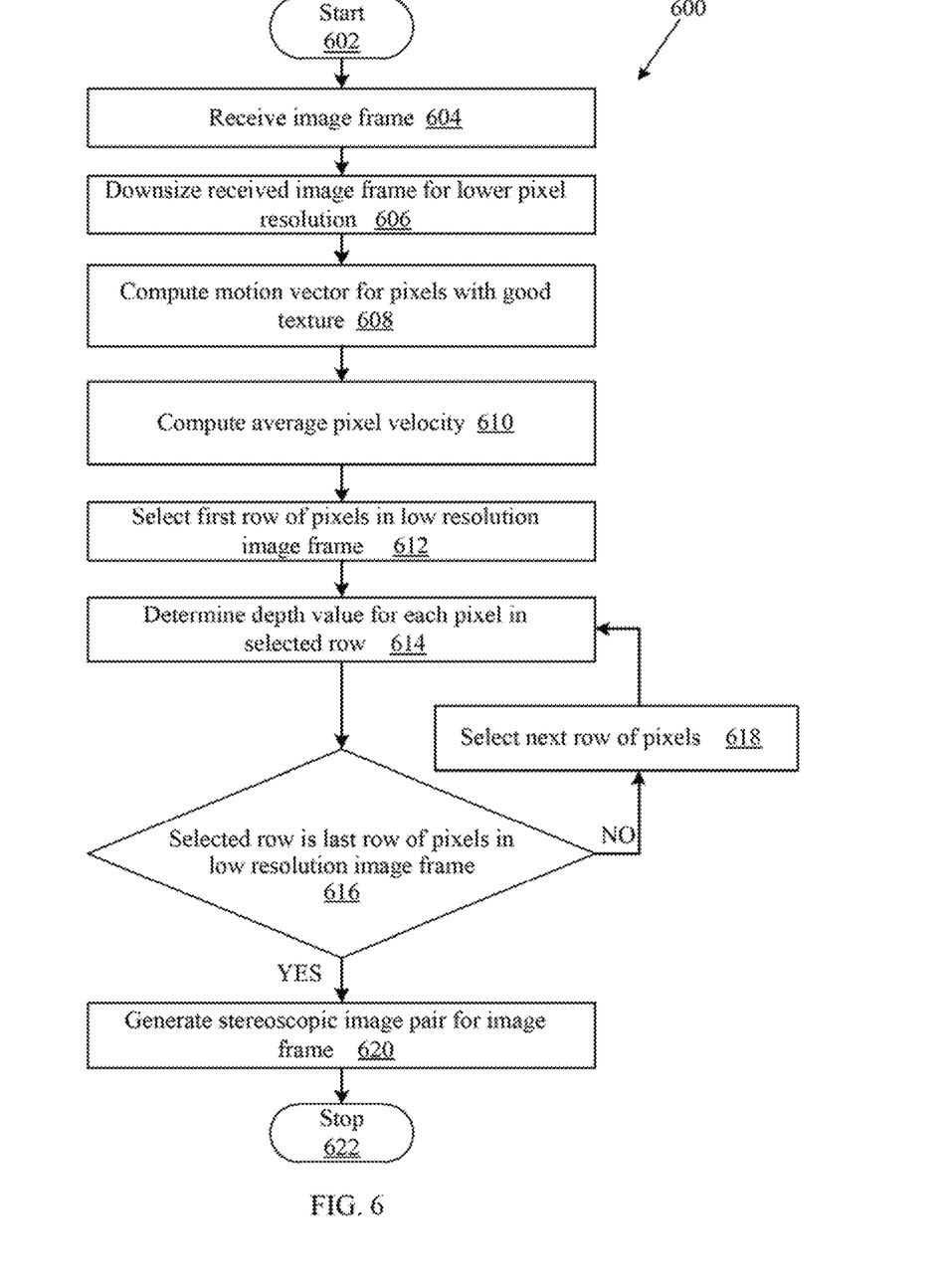
FIG. 6 is a flow chart illustrating exemplary steps for providing a real-time 2D-to-3D conversion at a computing device, in accordance with another embodiment of the disclosure.

FIG. 6 is a flow chart illustrating exemplary steps for providing a real-time 2D-to-3D conversion at a computing device, in accordance with another embodiment of the disclosure. In reference to FIG. 6, there is shown a method 600. The method 600 is described in conjunction with the elements of FIG. 1, FIG. 2, FIG. 3, and FIG. 4.

Exemplary steps begin at step 602. At step 604, the computing device 102 may receive the 2D content communicated by the external device (such as 104a). The processor 202 may receive the image frame 302 corresponding to the 2D content communicated by the external device (such as 104a). At step 606, the processor 202 may downsize the image frame 302 corresponding to the 2D content by a pre-defined factor to obtain an image frame with a lower pixel resolution. At step 608, the processor 202 may compute motion vectors for pixels, with texture above a certain threshold, in the image frame with lower pixel resolution. At step 610, the processor 202 may compute the average pixel velocity for the received image frame.

At step 612, the processor 202 may select the first row of pixels in the image frame with lower pixel resolution. At step 614, the processor 202 may determine the depth value for each pixel in the selected row. At step 616, the processor 202 checks whether the selected row is the last row of the image frame 302. In instances where the selected row is not the last row, the process proceeds to step 618. At step 618, the processor 202 selects the next row and proceeds to step 614. In instances where the selected row is the last row, the process proceeds to step 620. At step 620, the processor may generate the stereoscopic image pair corresponding to the image frame 302. The stereoscopic image pair may be generated based on the depth value associated with each pixel in the image frame 302. The method 600 ends at step 622.

In accordance with an embodiment of the disclosure, an apparatus for video processing may include a computing device 102 (FIG. 1) may be communicably coupled to an external device (such as 104a, FIG. 1). The computing device 102 may include one or more processors and/or circuits, for example, processor 202 (FIG. 2) may be operable to determine an average vertical velocity and an average horizontal velocity of a subset of pixels (such as 308a) in an image frame 302 (FIG. 3). The one or more processors and/or circuits may be operable to determine a depth value for each pixel of the subset of pixels (such as 308a) based on calculated motion vectors of each pixel of the subset of pixels (such as 308a), the average vertical velocity of the subset of pixels and the average horizontal velocity of the subset of pixels. In an embodiment, the one or more processors and/or circuits may be operable to determine a depth value for each pixel of the subset of pixels (such as 308a) based on calculated motion vectors of each pixel of the subset of pixels (such as 308a), an average vertical pixel velocity of the image frame 302 and an average horizontal pixel velocity of the image frame 302. The average vertical pixel velocity and the average horizontal pixel velocity may be determined based on pixels with the predetermined motion vectors in the image frame. The one or more processors and/or circuits may be operable to generate a stereoscopic image pair for the image frame 302 based on the determined depth value for each pixel in the image frame 302.

The one or more processors and/or circuits, for example, processor 202, may be operable to generate a stereoscopic image pair for the image frame 302 based on the depth map. The one or more processors and/or circuits, processor 202 for example, may be operable to generate a left image and a right image. The left image may be generated by shifting each pixel in the image frame 302 to the left by a particular value, and the right image may be generated by shifting each pixel in the image frame 302 to the right by the particular value. The particular value corresponding to each pixel in the image frame 302 may be proportional to a depth value associated with the pixel.

The one or more processors and/or circuits, for example, processor 202 may be operable to receive the image frame 302 from one or both of the external devices 104 (FIG. 1) and/or a local memory (such as 204, FIG. 2). The external devices 104 may include one or more of a video player 104a, a set-top-box 104b, a personal video recorder 104c, a cloud server 104d, and/or a video camera 104e. The computing device 102 may include one or more of a television, a smart phone, a tablet, a laptop, and/or a desktop computer.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps comprising in a computing device communicably coupled to an external device for video processing. The steps may include determining an average vertical velocity and/or an average horizontal velocity of a subset of pixels in an image frame. The steps may include determining a depth value for each pixel of the subset of pixels based on calculated motion vectors of each pixel of the subset of pixels, the average vertical velocity and the average horizontal velocity. The subset of pixels comprises pixels with predetermined motion vectors.

Accordingly, the present disclosure may be realized in hardware, or a combination of hardware and software. The present disclosure may be realized in a centralized fashion in at least one computer system or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to various embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for video processing, said method comprising:
    in a computing device:
        determining a depth value for each pixel of a subset of pixels in an image frame based on calculated motion vectors of said each pixel of said subset of pixels, an average vertical pixel velocity of said image frame and an average horizontal pixel velocity of said image frame,
            wherein said average vertical pixel velocity and said average horizontal pixel velocity are determined based on pixels with predetermined motion vectors in said image frame,
            wherein said determination of said depth value of a pixel of said subset of pixels in said image frame is based on a first difference and a second difference,
            wherein said first difference is a difference between a vertical velocity of said pixel in said image frame and said average vertical pixel velocity of said image frame, and said second difference is a difference between a horizontal velocity of said pixel in said image frame and said average horizontal pixel velocity of said image frame; and
        generating a stereoscopic image pair for said image frame based on said determined depth value for each pixel in said image frame.

2. The method of claim 1, wherein said determination of said depth value of said pixel of said subset of pixels in said image frame is based on summation of an absolute value of the first difference and an absolute value of the second difference.

3. The method of claim 1,
    wherein said average vertical pixel velocity and said average horizontal pixel velocity are determined based on background pixels of said image frame,
    wherein said background pixels are pixels that corresponds to a background in said image frame.

4. A method for video processing, said method comprising:
    in a computing device:
        determining an average vertical velocity and/or an average horizontal velocity of a subset of pixels in an image frame;
        determining a depth value for each pixel of said subset of pixels based on calculated motion vectors of said each pixel of said subset of pixels, said average vertical velocity and said average horizontal velocity,
            wherein said subset of pixels comprises pixels with predetermined motion vectors,
            wherein said determination of said depth value of a pixel of said subset of pixels in said image frame is based on a first difference and a second difference,
            wherein said first difference is a difference between a vertical velocity of said pixel in said image frame and said average vertical velocity of said subset of pixels, and said second difference is a difference between a horizontal velocity of said pixel in said image frame and said average horizontal velocity of said subset of pixels; and
        generating a stereoscopic image pair for said image frame based on said determined depth value for each pixel in said image frame.

5. The method of claim 4, wherein said generated stereoscopic image pair comprises:
    a left image in which said each pixel in said image frame is shifted left by a particular value; and
    a right image in which said each pixel in said image frame is shifted right by said particular value,
    wherein said particular value is proportional to said determined depth value associated with said each pixel in said image frame.

6. The method of claim 4, wherein said subset of pixels comprises one or more rows of pixels in said image frame.

7. The method of claim 4, wherein said calculated motion vectors of said each pixel of said subset of pixels comprises velocities of said each pixel in X and/or Y directions.

8. The method of claim 4, wherein said image frame is a two-dimensional (2D) image frame.

9. The method of claim 4, wherein said image frame is a two-dimensional (2D) image frame with a downsized pixel resolution.

10. The method of claim 4, comprising receiving said image frame from one or both of: an external device and/or a local memory.

11. The method of claim 4, wherein said computing device comprises one or more of: a television, a smart phone, a tablet, a laptop, and/or a desktop computer.

12. The method of claim 4, comprising receiving said image frame from one or more of: a video player, a set-top-box, a personal video recorder, a video camera, and/or a cloud server.

13. The method of claim 4, wherein said calculated motion vectors provide information regarding said horizontal velocity of said pixel and said vertical velocity of said pixel.

14. A computing device for video processing, said computing device comprising:
    one or more processors and/or circuits that are operable to:
        determine an average vertical velocity and/or an average horizontal velocity of a subset of pixels in an image frame;

determine a depth value for each pixel of said subset of pixels based on calculated motion vectors of said each pixel of said subset of pixels, said average vertical velocity and said average horizontal velocity, wherein said subset of pixels comprises pixels with predetermined motion vectors, wherein said determination of said depth value of a pixel of said subset of pixels in said image frame is based on a first difference and a second difference, wherein said first difference is a difference between a vertical velocity of said pixel in said image frame and said average vertical velocity of said subset of pixels, and said second difference is a difference between a horizontal velocity of said pixel in said image frame and said average horizontal velocity of said subset of pixels; and generate a stereoscopic image pair for said image frame based on said determined depth value for each pixel in said image frame.

15. The computing device of claim 14,
wherein said one or more processors and/or circuits are operable to generate said stereoscopic image pair based on generating a left image and a right image,
wherein said left image is generated by shifting left by a particular value, said each pixel in said image frame,
wherein said right image is generated by shifting right by said particular value, said each pixel in said image frame, and
wherein said particular value is proportional to said determined depth value of said each pixel of said image frame.

16. The computing device of claim 14, wherein said one or more processors and/or circuits are operable to calculate a depth map.

17. The computing device of claim 14, wherein said subset of pixels comprises one or more rows of pixels in said image frame.

18. The computing device of claim 14, wherein said calculated motion vectors of said each pixel of said subset of pixels comprises velocities of said each pixel in X and/or Y directions.

19. The computing device of claim 14, wherein said one or more processors and/or circuits are operable to receive said image frame from one or both of: an external device and/or a local memory.

20. The computing device of claim 19, wherein said external device comprises one or more of: a video player, a set-top-box, a personal video recorder, a video camera, and/or a cloud server.

21. The computing device of claim 14, wherein said computing device comprises one or more of: a television, a smart phone, a tablet, a laptop, and/or a desktop computer.

* * * * *